UNITED STATES PATENT OFFICE.

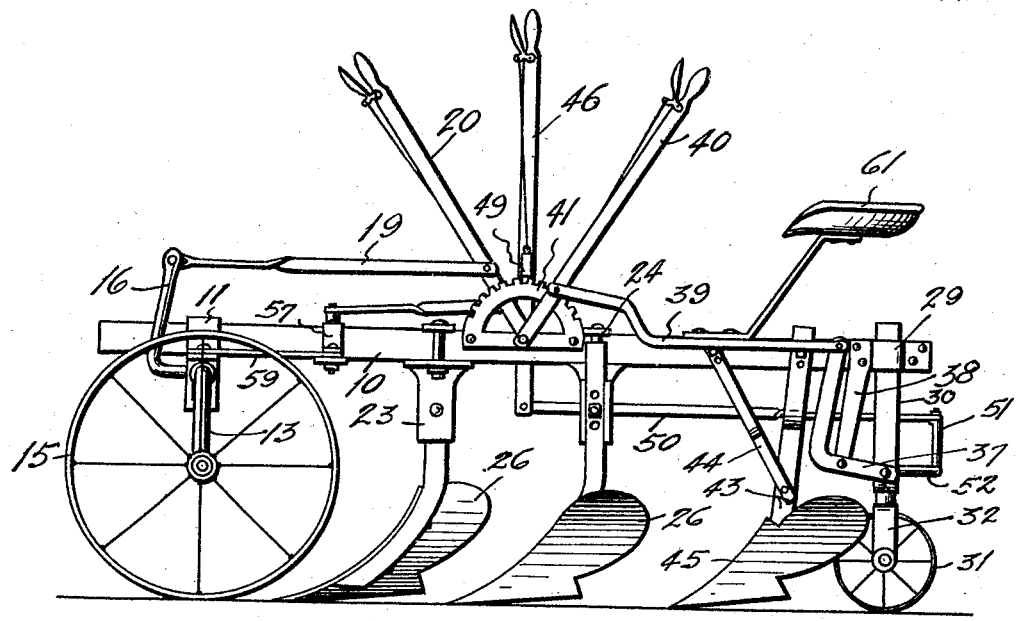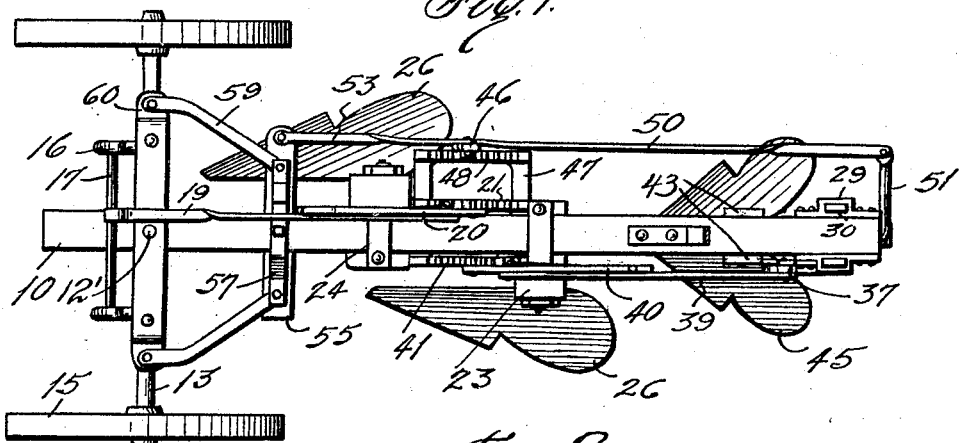

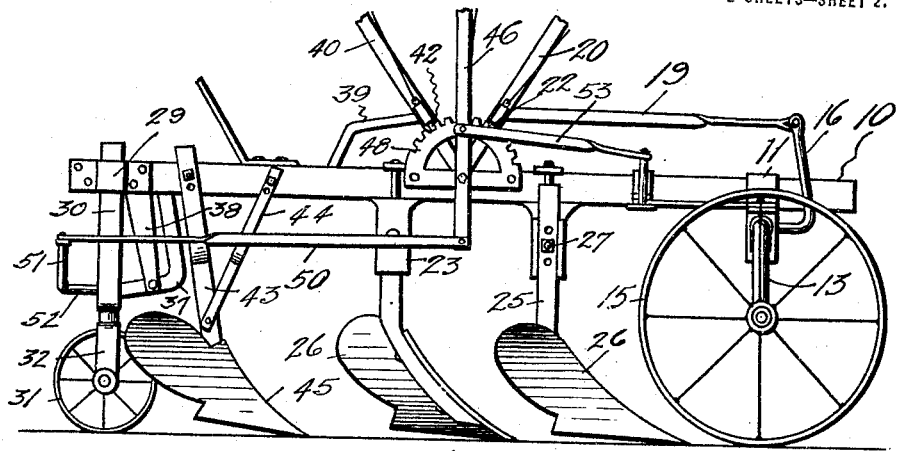
Fig. 3.
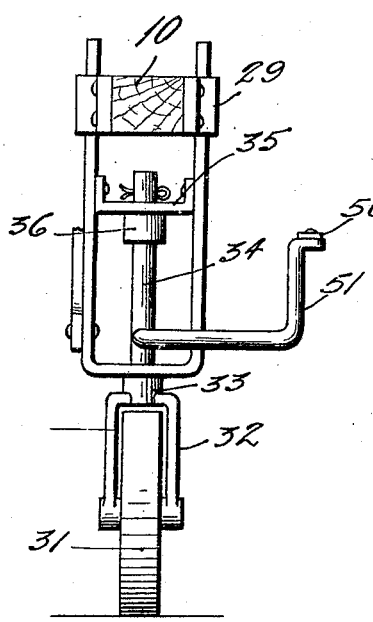
Fig. 6.
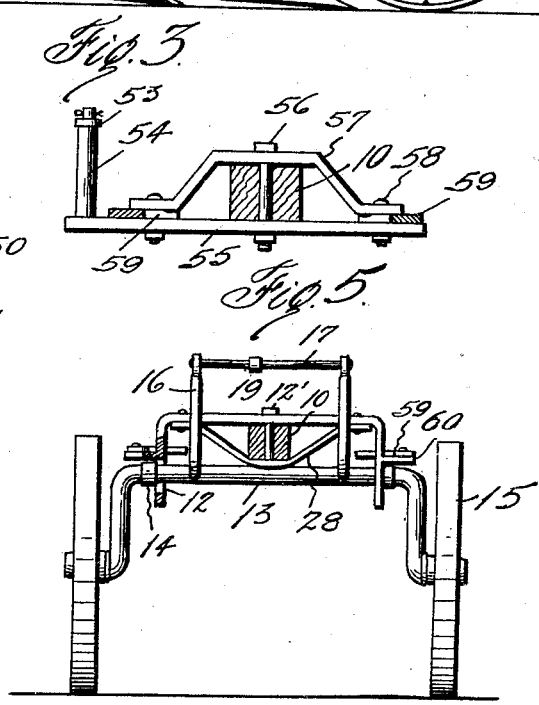
Fig. 5.
Fig. 4.

WILLIAM WENDTLAND, SR., OF SHINER, TEXAS.

LISTER PLOW.

1,410,233. Specification of Letters Patent. Patented Mar. 21, 1922.

Application filed September 17, 1920. Serial No. 410,953.

*To all whom it may concern:*

Be it known that I, WILLIAM WENDTLAND, Sr., a citizen of the United States, residing at Shiner, in the county of Lavaca and State of Texas, have invented certain new and useful Improvements in Lister Plows, of which the following is a specification.

This invention relates to new and useful improvements in lister plows.

The invention contemplates certain improvements on my Letters Patent No. 1,342,836, issued June 8, 1920, and involves additions as well as improvements.

One of the features of the invention is the provision of steering or guiding means which permits a short turn to be made at the end of the row. Another feature resides in means for adjusting the middle burster while the plow is in operation so that it may be set to any depth desired. It is also the object of the invention to arrange the parts in a convenient and simple manner, thus making for easy operation and efficiency in plowing.

In carrying out the invention a central beam is provided and carries right and left bottoms or turning shovels, which are mounted in advance of a middle breaker, the same as in my previous patent. However, in the improved construction the beam is supported on a caster wheel so as to be adjusted vertically thereby regulating the depth of the plowing done by the middle burster. The vertical adjustment is carried out by means of a lever which may be operated by the driver while plowing. The forward end of the beam is mounted upon front wheels which are arranged to steer and a steering lever is connected with the front steering gear and also the caster wheel, in such a way that by swinging said lever the wheels are thrown to a proper angle to make a short turn. This is a very important feature and gives good results. Improved means is also provided for vertically adjusting the front end of the beam whereby the right and left bottoms may be raised and lowered. Other improved features will be hereinafter pointed out.

The invention will be more readily understood from a reading of the following specification and by reference to the accompanying drawings, in which an example of the invention is shown, and wherein:

Fig. 1 is a side elevation of a lister constructed in accordance with my invention, Fig. 2 is a plan view of the same, Fig. 3 is an elevation of the side opposite from that shown in Fig 1, Fig. 4 is a cross sectional detail showing the front running gear, Fig. 5 is a detail of the front steering bracket, and Fig. 6 is an elevation of the caster wheel and component parts.

In the drawings the numeral 10 designates a longitudinal central beam which may be of any suitable material. An arch bar 11 is pivoted on the beam by a king bolt 12' near the forward end. In the depending sides of the bar 11 vertical slots 12 are provided. An arched axle 13 engages in the slots 12 of the bar and has collars 14 at each side disposed to hold the axle against lateral displacement, but permitting it to slide vertically or oscillate in the slots. The axle has its outer ends supported in ground wheels 15.

Within the arched bar 11 a pair of angular upstanding arms 16 are secured to the axle and have their upper ends above said bar connected by a cross rod 17. A link 19 extends rearwardly from the rod 17 to a hand lever 20 pivoted on the side of the beam in concentric relation to a segment 21. The lever carries a locking plunger 22 which engages the segment for holding the said lever in adjusted positions. When the lever 20 is drawn forward the axle 13 is in an upright position as will be seen. By pulling the lever 20 rearwardly the arms 16 are swung rearwardly by means of the link 19 and rod 17. This causes the axle to tilt forwardly thereby lowering the front end of the beam. It will be seen that the elevation of the front end of the beam may be controlled by adjusting the lever 20.

Hangers 23 are fastened on the beam by clamps 24. The hanger on the right hand side is set in advance of the other hanger. Each hanger has a vertical socket receiving the standard 25 of a bottom or shovel 26. Each standard is secured by a bolt 27 in its hanger and is vertically adjustable. The shovels are arranged to throw the soil outward on each side of the beam, each thus forming a half bed. A rocker 28 is fastened within the arch bar 11 and passes under the beam so as to bear on the axle 13. By reason of the slots 12 and the rocker the axle may rock so that an upward displacement of one of the wheels will not lift the shovels out of the ground. This feature is the same as in my patent before referred to.

At each side of the rear end of the beam keepers 29 receive the upper ends of a yoke 30 which are free to slide vertically therein. A caster wheel 31 is pivoted in an upright fork 32 which has a collar 33 supporting the yoke 30. An integral stem 34 extends upwardly from the collar through the bottom of the yoke 30 and has its upper end pivoted in a cross brace 35 fastened in the yoke. A collar 36 on the stem bears against the underside of the cross brace 35. A bell crank 37 is pivoted on an arm 38 depending from the beam 10 as is best shown in Fig. 1. The lower end of said lever is pivoted to the side of the yoke 30 near the lower end of the latter; while the upper end of said lever is pivoted to the rear end of an off-set link 39. The forward end of the link is pivoted to a lever 40 mounted on a locking segment 41, and carries a locking plunger 42. By swinging the lever 40 the bell crank lever is swung and the yoke 30 raised and lowered in the keepers 29; whereby the rear end of the beam is raised and lowered.

Just in front of the keepers 29 a forked standard 43 straddles the beam and has its foot lying under the center thereof. Braces 44 extend from the standard up to the beam. A middle breaker bottom 45 is mounted on the foot of the standard. The shovels 26 and the bottom 45 have ample mold boards so as to efficiently turn and displace the soil. By observing Fig. 2 it will be seen that the gap or strip left between the turning shovels 26 is fully broken and the soil thrown onto the right and left beds by the middle breaker bottom which overlaps the bars of the shovels. The shovels being set one in advance of the other reduce the liability of trash and stalks catching thereon as is obvious.

One of the features of the invention is the steering means. For this purpose I mount a lever 46 on the right hand side of the beam on a bracket 47 whereby said lever is off-set laterally. The lever is pivoted concentrically of a locking segment 48 and carries a locking plunger 49 adapted to engage said segment whereby the lever is held in position. The lever 46 projects below its pivot point and has pivoted to its lower end the forward end of a rearwardly extending link 50. The rear end of the link is pivoted to the upper end of an angular arm 51 which extends at right angles from the end of a shank 52 extending rearwardly from the stem 34. This construction is necessary so as to give clearance to the arm 51 when the latter is swung so it will not contact with the yoke 30. When the arm 51 is swung the stem 34 will be rotated, thereby turning the fork 32 and the caster wheel 31.

A forwardly extending link 53 extends from the lever 46 above its pivot point as is best shown in Fig. 3. The link 53 is given a twist and has its forward end pivoted on the upper end of a post 54. The post is fastened on a cross bar 55 which is pivoted to the underside of the beam 10 by a bolt 56. A keeper 57 is also pivoted on the upper side of said beam by said bolt and has its ends attached to bolts 58 passing down through the bar 55. The rear ends of links 59 are confined between the keeper and said bar on the bolts 58 to which they are pivoted. The parts 55 and 57 form a pivoted steering bracket. The forward ends of the links 59 are pivoted to ears 60 projecting from each side of the arch bar 11. It will be seen that when the steering bracket is swung the arch bar being pivoted on the king bolt 12′, will also be swung thus swinging the axle 13 and the ground wheels 15. It is obvious that the link 50 being pivoted to the lever 46 below the pivot point of said lever, and the link 53 being pivoted to said lever above its pivot point, upon the swinging of said lever 46 the links will be moved in opposite directions and consequently the front wheels and the caster wheel will be swung or cut toward the beam on the same side, thereby placing them in position to negotiate a short turn as will be obvious. It will be seen that all three of the levers are within easy reach of the driver who may occupy a seat 61 conveniently placed on the beam.

In using the lister it is drawn through the field by a team or tractor to which it is suitably attached. The lever 20 is swung to lower the shovels 26 to the proper depth. The lever 40 is also swung so as to adjust the middle breaker bottom 45 to the proper depth by raising and lowering the beam 10 on the yoke 30. As the plow moves over the ground returning shovels break the soil and turn it to the right and left, throwing up half a bed on each side, but leaving an unbroken strip in the center. The middle breaker bottom cuts this center strip and beds the soil in the furrows left by the shovels. The lister is guided by means of the lever 46 and when the end of the row is reached the front and rear wheels may be cut by swinging the lever so as to make a short turn.

What I claim, is:

1. In a lister plow, a support embodying a longitudinal beam, an arched axle extending transversely of the beam, a pivoted support carried by the forward end of the beam and extending transversely thereof and adapted to be swung longitudinally of the beam, said pivoted support having the axle pivotally mounted therein, means for swinging the axle upon its longitudinal axis to raise and lower the beam, ground wheels carried by the axle and supporting the same, steering means connected with the pivoted support to swing the same longitudinally of the beam, a rocker device secured to the pivoted support and extending beneath the beam and resting upon the axle, a caster wheel supporting the rear end of the beam, and means for steering the caster wheel in unison with the ground wheels.

2. In a lister plow, a support embodying a longitudinal beam, an arched axle extending transversely of the beam, a pivoted support carried by the front end of the beam and extending transversely thereof and adapted to be swung longitudinally of the beam, said pivoted support having the arched axle pivotally mounted therein, means for swinging the axle upon its longitudinal axis to raise and lower the beam, ground wheels carried by the arched axle for supporting the same, steering means connected with the pivoted support to swing it longitudinal of said beam, a rocker device having rigid connection with the beam and arranged beneath it and resting upon the axle, a caster wheel supporting the rear end of the beam, means for steering the caster wheel in unison with the ground wheels, and means for vertically adjusting the rear end of the beam with relation to the caster wheel.

3. In a lister plow, a support, a pivoted support carried by the front end of the first named support and extending transversely thereof and adapted to be swung longitudinally of the same, said pivoted support embodying depending arms having slots therein, an arched axle loosely mounted in the slots, means for swinging the arched axle upon its longitudinal axis for raising and lowering the first named support, ground wheels carried by the arched axle and supporting same, a yoke vertically adjustably secured to the rear end of the first named support, means mounted on the first named support and connected with the yoke for raising and lowering the first named support with respect to the yoke, a caster wheel pivoted to the yoke, a steering lever, a connection between the steering lever and the caster wheel, and a second connection between the lever and the pivoted support.

In testimony whereof I affix my signature.

WILLIAM WENDTLAND, Sr.